(12) United States Patent
Inoue et al.

(10) Patent No.: US 6,361,127 B1
(45) Date of Patent: Mar. 26, 2002

(54) AUTOMATIC OPERATION DETECTOR FOR AUTOMATIC BRAKE UNIT

(75) Inventors: Hidefumi Inoue; Naohito Saito, both of Saitama-Ken (JP)

(73) Assignee: Bosch Braking Systems Co., Ltd., Tokyo (JP)

( * ) Notice: Subject to any disclaimer, the term of this patent is extended or adjusted under 35 U.S.C. 154(b) by 0 days.

(21) Appl. No.: 09/660,615

(22) Filed: Sep. 13, 2000

(30) Foreign Application Priority Data

Oct. 15, 1999 (JP) .......................................... 11-293460

(51) Int. Cl.$^7$ ................................................ B60T 8/44
(52) U.S. Cl. .................................................... 303/114.3
(58) Field of Search ............................ 303/114.3, 191, 303/125, 135; 91/376 R

(56) References Cited

U.S. PATENT DOCUMENTS

| | | | | |
|---|---|---|---|---|
| 4,655,511 A | * | 4/1987 | Leiber .......................... | 303/92 |
| 5,261,730 A | * | 11/1993 | Steiner et al. ............ | 303/113.4 |
| 5,350,225 A | * | 9/1994 | Steiner et al. ............ | 303/113.4 |
| 5,487,325 A | * | 1/1996 | Bayliss et al. ............ | 91/376 R |
| 5,492,397 A | * | 2/1996 | Steiner ....................... | 303/157 |
| 5,564,797 A | * | 10/1996 | Steiner et al. ............ | 303/113.4 |
| 5,669,676 A | * | 9/1997 | Rump et al. ................ | 303/125 |
| 5,697,469 A | * | 12/1997 | Karer et al. ................ | 180/268 |
| 5,720,532 A | * | 2/1998 | Steiner et al. .............. | 303/125 |
| 5,772,290 A | * | 6/1998 | Heibel et al. ............ | 303/113.4 |
| 5,845,556 A | * | 12/1998 | Tsubouchi et al. ............. | 91/367 |
| 5,873,247 A | * | 2/1999 | Schluter et al. ................ | 60/534 |
| 6,007,160 A | * | 12/1999 | Lubbers et al. ........... | 303/114.1 |
| 6,021,704 A | * | 2/2000 | Drumm et al. ............. | 91/369.2 |
| 6,033,039 A | * | 3/2000 | Dieringer .................. | 303/114.3 |
| 6,135,578 A | * | 10/2000 | Clar et al. ................ | 303/114.3 |
| 6,213,572 B1 | * | 4/2001 | Linkner et al. ............. | 303/155 |
| 6,216,580 B1 | * | 4/2001 | Kobayashi et al. ........ | 91/376 R |

FOREIGN PATENT DOCUMENTS

| | | |
|---|---|---|
| JP | 9-86395 | 3/1997 |
| JP | 2000-127947 | 5/2000 |

* cited by examiner

Primary Examiner—Christopher P. Schwartz
Assistant Examiner—Benjamin A. Pezzlo
(74) Attorney, Agent, or Firm—Flynn, Thiel, Boutell & Tanis, P.C.

(57) ABSTRACT

A detection switch is mounted on an input shaft through a clevis for detecting the operation of an automatic brake unit without the depression of a brake pedal. The detection switch may also be mounted on the brake pedal. The clevis and the brake pedal are connected together in a manner to permit a relative displacement therebetween through an operating stroke of the detection switch. When the brake pedal is depressed, the brake pedal is maintained at an advanced position relative to the input shaft, and the detection switch detects a retracting movement of the brake pedal with respect to the input shaft from the advanced position during an automatic brake operation. The arrangements allow the detection switch to be mounted on either the input shaft or the brake pedal, does not require design of a small size and facilitates the mounting of the detection switch.

4 Claims, 3 Drawing Sheets

AUTOMATIC OPERATION DETECTOR FOR AUTOMATIC BRAKE UNIT

FIELD OF THE INVENTION

The invention relates to an automatic brake unit capable of operating a brake booster without the depression of a brake pedal, and more particularly, to an automatic operation detector which detects an operation of an automatic brake unit.

DESCRIPTION OF THE PRIOR ART

An automatic brake unit is known in the art which comprises a brake booster, a brake pedal which, when depressed, drives an input shaft of the brake booster to operate it, an automatic brake operating mechanism which operates the brake booster without the depression of the brake pedal, and a detection switch for detecting the operation of the brake booster without the depression of the brake pedal (Japanese Laid-Open Patent Application No. 86395/1997 and 127947/2000).

The detection switch is contained in a valve body of the brake booster. However, in order to allow the detection switch to be contained in the valve body, a redesign of passages and/or a change in the configuration of adjacent parts is required, presenting a difficulty in securing a space to contain the switch.

If a space can be secured to contain the detection switch, the space is very limited and thus requires a special design of a small size for the detection switch, resulting in an increased cost and an assembly which is less than desired.

SUMMARY OF THE INVENTION

In view of the foregoing, it is an object of the present invention to provide an automatic operation detector for an automatic brake unit which avoids a need for a special design of a small size for a detection switch and which allows a mounting space for the switch to be easily secured.

Specifically, in accordance with the present invention, there is provided an automatic brake unit comprising a brake booster, a brake pedal which, when depressed, drives an input shaft of the brake booster to operate it, an automatic brake operating mechanism which operates the brake booster without the depression of the brake pedal, and a detection switch for detecting the operation of the brake booster without the depression of the brake pedal;

the arrangement being such that the input shaft and the brake pedal are connected together in a manner to permit a relative displacement therebetween through at least an operating stroke of the detection switch, the detection switch being mounted on either the input shaft or the brake pedal so that when the brake pedal is depressed, the brake pedal is maintained at an advanced position with respect to the input shaft while the detection switch detects a retracting movement of the brake pedal with respect to the input shaft from the advanced position during an automatic brake operation.

With the described arrangement, the input shaft and the brake pedal are displaceable relative to each other through at least an operating stroke of the detection switch, which can then detect a retracting movement of the brake pedal with respect to the input shaft from the advanced position during an automatic brake operation.

On the other hand, during a normal brake operation, as the brake pedal is depressed, the brake pedal drives the input shaft forward. At this time, the brake pedal drives the input shaft forward while it is maintained at an advanced position with respect to the input shaft. Accordingly, this condition is not detected by the detection switch as an automatic brake operation.

Rather than containing the detection switch in a valve body of the brake booster, it can be mounted on either the input shaft or the brake pedal. Thus, a mounting space for the detection switch can be easily secured and no special design of a small size is required therefor, thus facilitating the mounting of the detection switch.

Above and other objects, features and advantages of the invention will become apparent from the following description of several embodiments thereof with reference to the drawings.

DETAILED DESCRIPTION OF THE EMBODIMENTS

Figure 1:
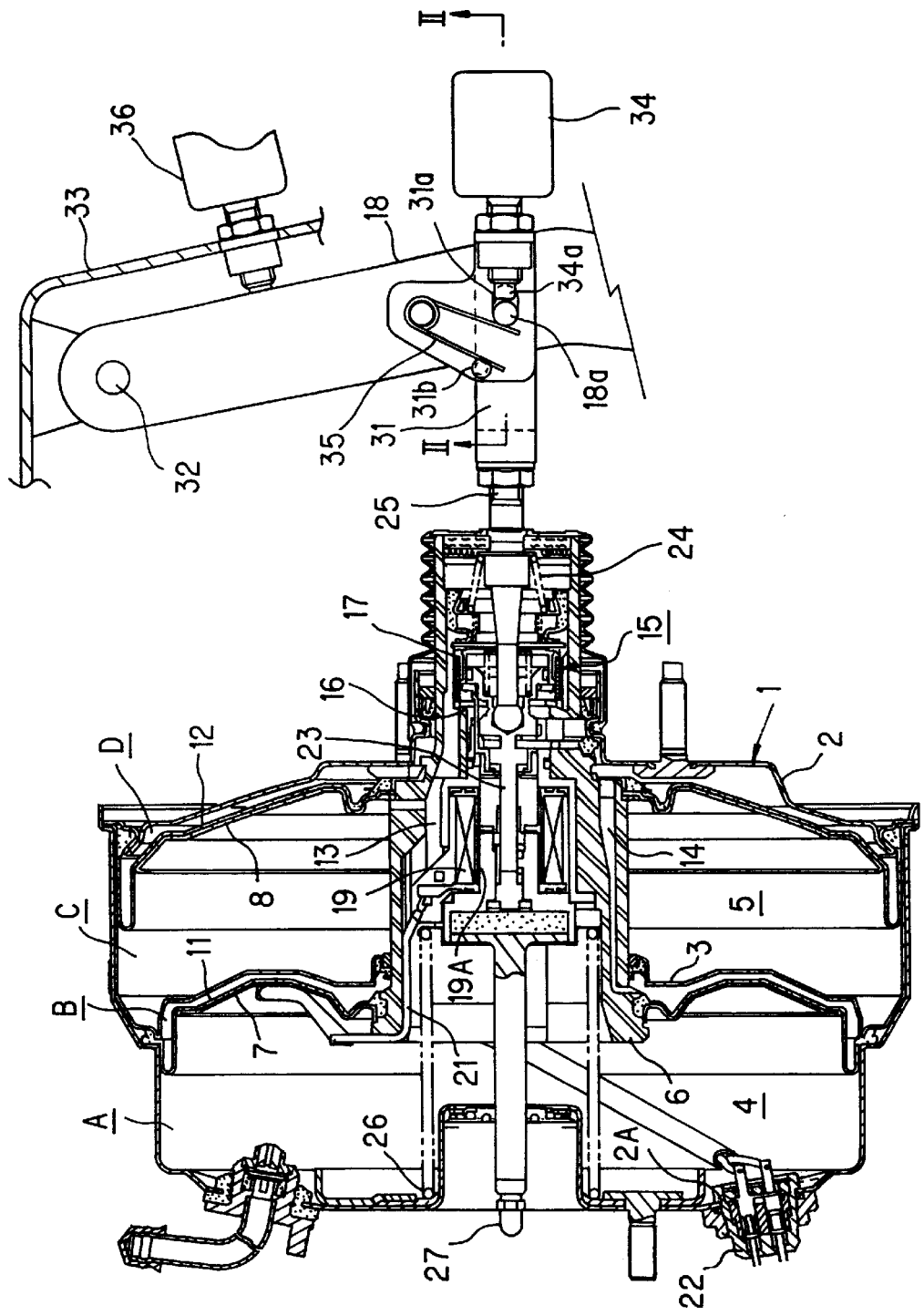
FIG. 1 is a cross section of a first embodiment of the invention.

Several embodiments of the invention will now be described with reference to the drawings. Referring to FIG. 1, a tandem brake booster 1 includes a shell 2, the interior of which is partitioned by a center plate 3 into a forwardly located front chamber 4 and a rearwardly located rear chamber 5. A substantially tubular valve body 6 is slidably fitted through the axial portion of the center plate 3.

A front power piston 7 is connected around the outer periphery of the valve body 6 which is located within the front chamber 4 while a rear power piston 8 is connected around the outer periphery of the valve body 6 which is located within the rear chamber 5.

A front diaphragm 11 is applied to the back surface of the front power piston 7 to divide the interior of the front chamber 4 into a forwardly located constant pressure chamber A and a rearwardly located variable pressure chamber B. A rear diaphragm 12 is applied to the back surface of the rear power piston 8 to divide the interior of the rear chamber 5 into a forwardly located constant pressure chamber C and a rearwardly located variable pressure chamber D.

The constant pressure chambers A and C communicate with each other through a constant pressure passage 13 formed in the valve body 6, thus normally introducing a negative pressure into the constant pressure chambers A and C. On the other hand, the variable pressure chambers B and D communicate with each other through a variable pressure passage 14 formed in the valve body 6.

A valve mechanism 15, which is known in itself, for switching a communication between the constant pressure chambers A and C and the variable pressure chambers B and D is mounted inside the valve body 6 at a rear portion thereof.

Specifically, the valve mechanism 15 comprises a vacuum valve 16 and an atmosphere valve 17, and in the inoperative condition shown where a brake pedal 18 is not depressed, the vacuum valve 16 is open while the atmosphere valve 17 is closed. Thus, in the inoperative condition, the constant pressure chambers A and C and the variable pressure chambers B and D communicate with each other, and a negative pressure is introduced into these chambers.

A solenoid 19 is disposed inside the valve body 6 and has lead wires 21, which are applied to the front internal peripheral surface of the valve body 6 to extend axially forward, whereupon they cross the constant pressure chamber A to be passed through a grommet 22, which is fitted into a through-opening 2A in the shell 2 so as to maintain a hermetic seal, to be connected to a power supply which is located outside the shell 2. In this manner, the solenoid 19 is electrically connected to the power supply, not shown, through the lead wires 21.

The solenoid 19 has an axial through-opening 19A in alignment with the axis thereof, into which the outer periphery of a front portion of a valve plunger 23, which forms part of the valve mechanism 15, is slidably fitted. The valve plunger 23 is normally urged rearward by a valve return spring 24, and accordingly, under the condition that the solenoid 19 is not energized, the atmosphere valve 17 is closed while the vacuum valve 16 is open.

If the brake pedal 18 is depressed in the inoperative condition shown where the solenoid 19 is not energized, an input shaft 25 and its connected valve plunger 23 are driven forward or to the left, whereby the vacuum valve 16 is closed while the atmosphere valve 17 is opened.

This interrupts the communication between the constant pressure chambers A and C and the variable pressure chambers B and D, and the atmosphere is introduced into the variable pressure chambers B and D. Accordingly, the pressure differential between the negative pressure within the constant pressure chambers A and C and the atmosphere within the variable pressure chambers B and D causes the valve body 6 and an output shaft 27 mounted thereon to be driven forward against the resilience of a return spring 26. In this manner, the tandem brake booster 1 is operated.

If the brake pedal 18 is released under the operated condition, the valve return spring 24 urges the valve plunger 23 backward, whereby the atmosphere valve 17 is closed while the vacuum valve 16 is opened. This establishes the communication between the constant pressure chambers A and C and the variable pressure chambers B and D again, and these chambers assume an equal pressure. Accordingly, the valve body 6 and the output 27 return to their inoperative positions shown under the resilience of the return spring 26.

When the solenoid 19 is energized under the inoperative condition shown in FIG. 1, the magnetic force from the solenoid 19 moves the valve plunger 23 forward relative to the valve body 6, thus allowing the atmosphere valve 17 to be opened and the vacuum valve 16 to be closed without the depression of the brake pedal 18. In this manner, the tandem brake booster 1 can be operated as an automatic brake. At this time, the input shaft 25 and the brake pedal 18 are driven integrally forward as the tandem brake booster 1 is operated.

The arrangement described above remains substantially unchanged from the known arrangement. In the present embodiment, the solenoid 19, the lead wires 21 and the power supply, not shown, constitute together an automatic brake operating mechanism. However, any arrangement may be used as such an automatic brake operating mechanism which is capable of operating the brake booster 1 without the depression of the brake pedal 18.

An automatic operation detector which detects the operation of the brake booster 1 without the depression of the brake pedal 18 is constructed as follows:

Specifically, a clevis 31 is connected to the rear end of the input shaft 25, and the input shaft 25 is coupled to the brake pedal 18 through the clevis 31. At its upper end, the brake pedal 18 is connected in a rockable manner to a car body 33 through a pin 32.

Figure 2:
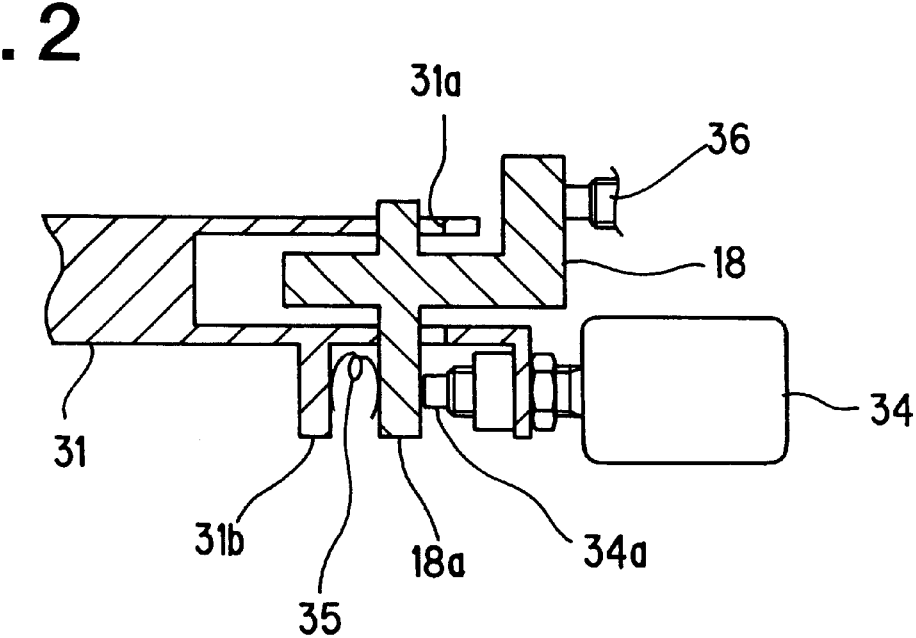
FIG. 2 is a cross section taken along the line II—II shown in FIG. 1.

As shown in FIGS. 1 and 2, the clevis 31 is formed with an opening 31a which is elongate in a direction in which the brake pedal 18 rocks, and a pin 18a projecting from the brake pedal 18 is engaged with the elongate opening 31a, thus permitting the input shaft 25 and the brake pedal 18 to be connected together while allowing a relative displacement therebetween through a travel of the pin 18a within the elongate opening 31a.

The rear end of the clevis 31 is bent into an L-configuration, and a detection switch 34 is mounted thereon. The detection switch 34 has a probe 34a which is disposed in abutment against the pin 18a of the brake pedal 18 from the rear side. The probe 34a projects from the detection switch 34 to turn it off when the pin 18a of the brake pedal 18 is located forwardly within the elongate opening 31a, but is urged into the detection switch 34 to turn it on when the pin 18a of the brake pedal 18 moves rearward within the elongate opening 31a. In this manner, the input shaft 25 and the brake pedal 18 are displaceable relative to each other through at least an operating stroke of the detection switch 34.

A spring 35 is disposed between the pin 31b projecting from the clevis 31 and the pin 18a from the brake pedal 18, and the resilience of the spring 35 urges the pin 31b of the clevis 31 forward relative to the pin 18a of the brake pedal 18. The resilience of the spring 35 is chosen to be less than the resilience of the valve return spring 24 which is disposed within the valve body 6.

It is to be noted that the brake pedal 18 is not associated with a pedal return spring which is usually provided in order to maintain the brake pedal 18 at its inoperative position, but is adapted to maintain the input shaft 15 and the brake pedal 18 in their inoperative positions shown in FIG. 1 under the resilience of the valve return spring 24 disposed within the valve body 6.

Under this condition, the brake pedal 18 is maintained in its inoperative position in which it abuts against a stop lamp switch 36 mounted on the car body 33, and assumes an advanced position relative to the clevis 31 and the input shaft 25, and accordingly, the pin 18a from the brake pedal 18 is located forwardly within the elongate opening 31a in the clevis 31 against the resilience of the spring 35, whereby the detection switch 34 remains to be off.

In the described arrangement, if the brake pedal 18 is depressed under the inoperative condition shown, the force of depression applied to the brake pedal 18 is transmitted through the pin 18a of the brake pedal 18 to the clevis 31 and the input shaft 25, whereby the brake pedal 18 is maintained at its advanced position relative to the clevis 31 and the input shaft 25, maintaining the detection switch 34 off.

Accordingly, the brake booster 1 is operated as the brake pedal 18 and the input shaft 25 are driven forward, but the detection switch 34 remains off, and this condition of operation cannot be detected as an automatic brake condition.

During this normal operation, the pin 18a of the brake pedal 18 directly urges against the clevis 31, thus avoiding any degradation in the feeling during the normal brake operation which might otherwise be caused by a rattling or a lost motion caused by the elongate opening 36a provided corresponding to the stroke of the detection switch 34.

Figure 3:
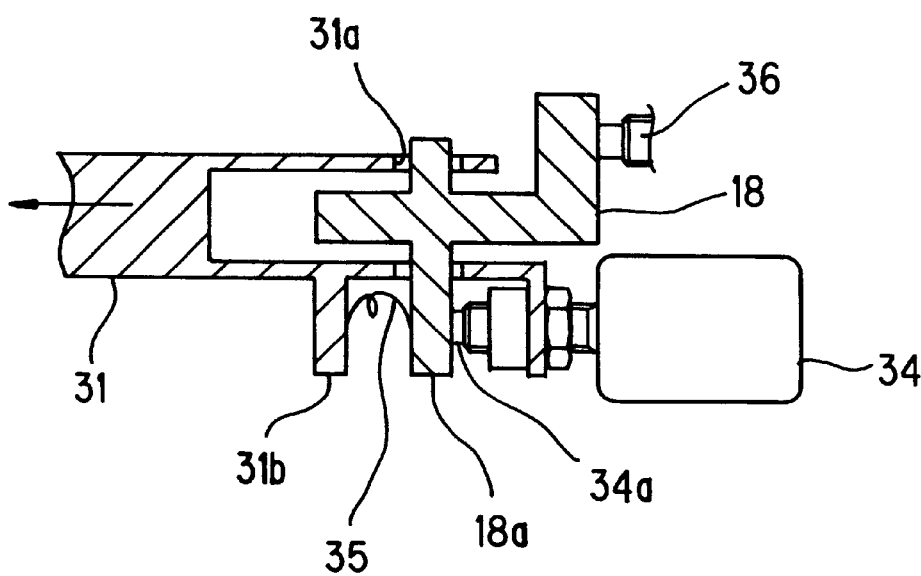
FIG. 3 is a cross section illustrating a phase of operation which is different from that shown in FIG. 2.

By contrast, when the solenoid 19 is energized by the automatic brake operating mechanism mentioned above, the magnetic force from the solenoid 19 moves the valve plunger 23 forward relative to the valve body 6 as mentioned previously, thus opening the atmosphere valve 17 and closing the vacuum valve 16 without the depression of the brake pedal 18. As the input shaft 25 and the clevis 31 are driven forward, the resilience of the spring 35 causes the pin 18a of the brake pedal 18 to move rearward within the elongate slot 31a, whereupon the detection switch 34 is turned on to indicate the automatic brake operation (see FIG. 3).

After the pin 18a of the brake pedal 18 has moved to the rear end of the elongate opening 31a, the brake pedal 18 is driven forward integrally while maintaining its retracted position with respect to the clevis 31 and the input shaft 25.

As shown in the embodiment illustrated, it is not necessary that the detection switch 34 be contained within the valve body 6 of the brake booster 1, but may be mounted on the clevis 31 associated with the input shaft 25, and accordingly, there is no need for a special design of a small size for the detection switch, which can be easily mounted in a space which can be easily secured.

Figure 4:
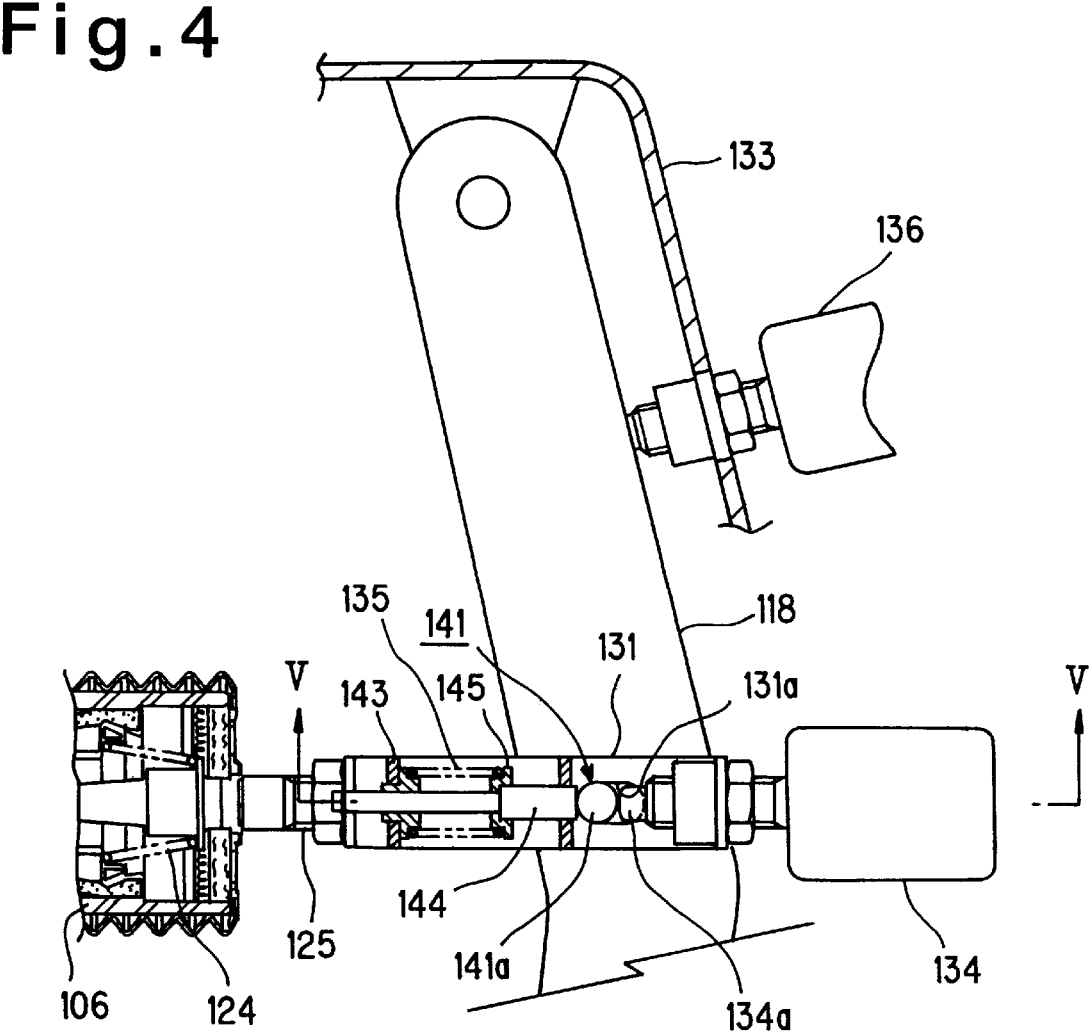
FIG. 4 is a fragmentary cross section of an essential part of a second embodiment of the invention.
Figure 5:
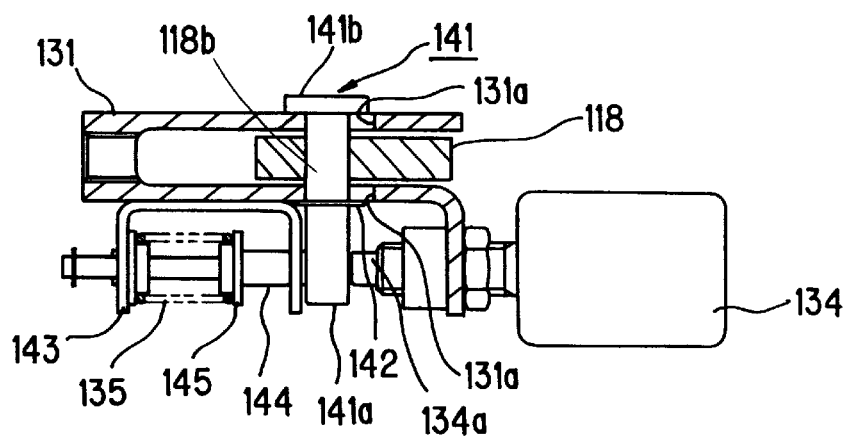
FIG. 5 is a cross section taken along the line V—V shown in FIG. 4.

FIGS. 4 and 5 show a second embodiment of the invention. In the first embodiment mentioned above, the brake pedal 18 is integrally formed with the pin 18a, but in the second embodiment, a pin 141 is separate from a brake pedal 118. The pin 141 includes a shank 141a which extends from one side of a clevis 131 sequentially through an elongate opening 131a formed in one side of the clevis 131, a through-opening 118b formed in a brake pedal 118 and an elongate opening 131a formed in the other side of the clevis 131. The pin 141 has a head 141b, and a washer 142a is mounted on the shank 141a to cooperate with the head 141b to prevent the pin 141 from being withdrawn from the clevis 131 and the brake pedal 118.

The rear end of the clevis 131 is bent into an L-configuration, on which a detection switch 134 is mounted. The detection switch 134 has a probe 134a which is disposed in abutment against the shank 141a of the pin 141 integrally mounted on the brake pedal 118 from the rear side.

A channel-shaped bracket 143 is mounted on the side of the clevis 131, and a pusher pin 144 slidably extends through the opposite ends of the bracket 143. The pusher pin 144 is slidable axially of an input shaft 125, and has a step on which a retainer 145 is mounted. A spring 135 is disposed between the retainer 145 and the bracket 143 to urge the pin 144 rearward until the rear end of the pin 144 resiliently abuts against the pin 141.

Thus, the spring 135 acts through the pin 144 to urge the pin 141 and the brake pedal 118 rearward or in a direction in which the detection switch 134 can be turned on. However, the resilience of the spring 135 is chosen to be less than the resilience of a valve return spring 124 which is disposed within a valve body 106, whereby the detection switch 134 remains off in an inoperative condition in which the brake pedal 118 abuts against a stop lamp switch 136 mounted on a car body 133. It will be apparent that the second embodiment is capable of achieving equivalent function and effect as achieved by the first embodiment.

In the both embodiments mentioned above, the detection switch 34 or 134 is mounted on the input shaft 25 or 125 through the interposition of the clevis 31 or 131. However, it should be understood that the detection switch may also be mounted on the brake pedal, and since such an arrangement would be obvious to one skilled in the art, it will not be specifically illustrated.

While the invention has been described above in connection with several embodiments thereof, it should be understood that a number of changes, modifications and substitutions therein are possible in light of the above disclosure without departing from the spirit and the scope of the invention defined by the appended claims.

What is claimed is:

1. An automatic brake unit comprising a brake booster, a brake pedal for driving and operating an input shaft of the brake booster when depressed, the brake pedal and input shaft being coupled together to allow relative movement between each other in a predetermined range between a most advanced position and a most retracted position, a detection switch for detecting the operation of the brake booster without the depression of the brake pedal provided on one of the input shaft and the brake pedal, an operating member for operating the detection switch provided on the other of the input shaft and the brake pedal, a first spring for biasing the input shaft forward relative to the brake pedal and a brake return spring provided in the brake booster for biasing the input shaft rearward, the biasing force of the first spring being less than the biasing force of the brake return spring, wherein the brake pedal is provided at the most advanced position when depressed and when the input shaft advances forwardly relative to the brake pedal in response to operation of the automatic brake operating mechanism, the detection switch is operated by the operating member and detects the operation of the brake booster.

2. The automatic brake unit of claim 1, wherein a clevis having a slot is mounted on the input shaft, a pin is provided on the brake pedal, inserted in the slot to allow relative movement between the input shaft and the brake pedal and is the operating member and the detection switch is mounted on the clevis.

3. The automatic brake unit of claim 1, wherein the input shaft and brake pedal are held at inoperative positions by the biasing force of the brake return spring.

4. The automatic brake unit of claim 2, wherein the input shaft and brake pedal are held at inoperable positions by the biasing force of the brake return spring.

* * * * *